UNITED STATES PATENT OFFICE.

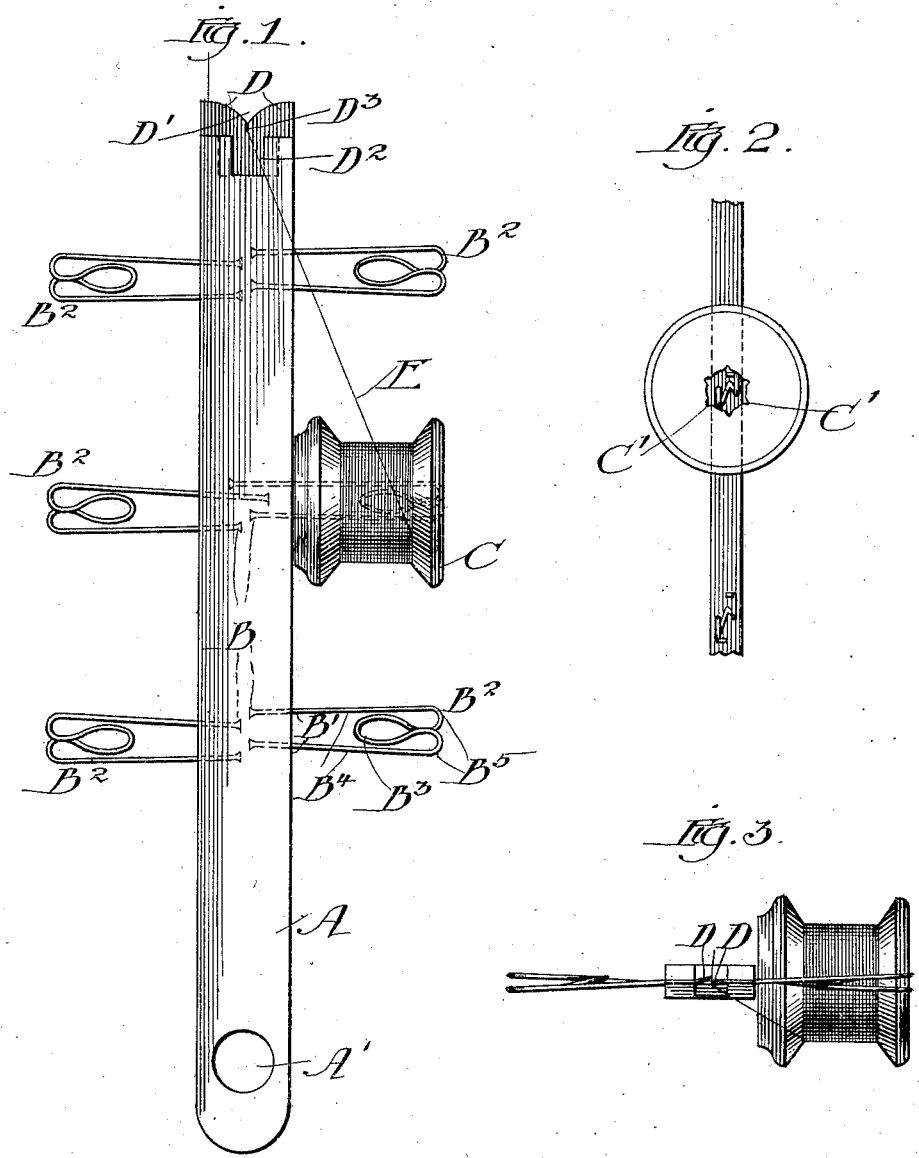

VICTOR H. CANHAM, OF GUELPH, ONTARIO, CANADA.

SPOOL-HOLDER.

972,160.  Specification of Letters Patent.  Patented Oct. 11, 1910.

Application filed February 18, 1909. Serial No. 478,705.

*To all whom it may concern:*

Be it known that I, VICTOR H. CANHAM, a subject of the King of England, residing at Guelph, in the Province of Ontario, Dominion of Canada, have invented a certain new and useful Improvement in Spool-Holders, of which the following is a specification.

My invention relates to spool holders. It is illustrated in the accompanying drawings, wherein—

Figure 1 is a plan view with parts shown in dotted lines; Fig. 2 is an end view; Fig. 3 is a detail of the spool holder.

Like parts are indicated by the same letter in all the figures.

A is a body preferably of wood having at one end the aperture $A^1$ whereby it may be suspended. Along the sides of this body are distributed the spool holders. Each preferably consists of a spring, the two ends of which B, B, are flattened as shown so that when forced into the wood they are less likely to turn or be withdrawn. At the point where these spring ends emerge from the body the distance between their outer sides, indicated at $B^1$, is approximately equal to the diameter of the hole in the spool. The spring ends are most widely separated near their outer extremities at the place indicated by the line $B^2$, so that they have to be sprung together to receive the spool, and to yieldingly hold it near the outer end of the spool holder. This arrangement tends to force the spool inwardly toward the body and keep it on the spool holder while it is being rotated. In order to give the spool holder spring the requisite elasticity its middle portion $B^3$ is bent inwardly to form an inner loop between the sides $B^4$ $B^4$ and its outer portion is looped so as to make two outer loops $B^5$ $B^5$ which together form the outer and widened spring end of the spool holder. The spool C is commonly provided with the grooves $C^1$ on its inner surface and they receive the outer loops of the holder which passes through it and since these grooves are diametrically opposed to each other it is highly important that the loops $B^5$ $B^5$ should be separated as indicated in Fig. 3, for otherwise, as the spool rotates they will come together and cramp. Arranged as they are, they do not so cramp and the spool continues to rotate with comparative equality of tension or at least with no sufficient increase of tension to interfere with its convenient operation.

The knife has the two parts D D inwardly curved so as to make the V-shaped thread guide $D^1$ and it is provided with the inner projection $D^2$ which is driven into the end of the body to hold the knife in position. Inwardly projecting from the bottom of the V-shaped guide $D^1$ is the slit $D^3$. The two parts D, D are separated by being forced in opposite directions as indicated in Fig. 3, so as to leave a slight opening between them at the bottom of the guide, which allows the thread E to enter and causes it to be partly cut and partly broken across the edges of the slit.

It is obvious that the form, structure, arrangement and size of the several parts could be varied without departing from the spirit of my invention and it is equally obvious that some of them might be omitted without interfering with the function of the others.

I wish my drawing to be taken in a sense as diagrammatic or illustrative generally of my invention, though in point of fact it does exhibit a particular form of device which contains my invention.

I shall in my claims set forth the essential features which I desire to cover.

The use and operation of my invention are as follows: In the ordinary practice of the sewing art, spools of thread are thrown about carelessly and the thread becomes unwound and tangled. This device makes arrangement for a series of spools, and of course there might be any desired number, to be mounted on a single body so that they are permanently associated together. In this relation it is not easy for the thread to become unwound or the various threads to be seriously tangled as the holder and its associated spools are thrown about in ordinary practice. When the thread of any spool is to be used, it is taken between the thumb and forefinger and drawn off until the right length is obtained and then brought between the two parts and down into the slit where a further pull will cut and break the thread, leaving it with a brush like end, the fibers being separated so that it can be easily brought in condition to enter the eye of the needle. The end of the thread thus cut differs from an end cut by scissors or knife. When the spool is forced onto the spool holder the outer end of the spool holder is compressed and the spool slides inwardly along the holder until it reaches the edge of the body. In this position the spool is grasped from within by the spool holder with an excess of pressure at its outer end, but it is held from wabbling or tipping at its inner end because the inner end of the spool hole is just about as wide as the distance between the outside edges of the springs near the body. As previously explained, the spool freely rotates but tends always to move toward the body instead of away from it because of the spread and elasticity of the spool holder at its outer end. The length of the spool holder should be such that the outer end will always extend beyond the middle of any ordinary spool which may be applied to it and in this event any smaller spool will also be kept in position near the body.

I claim:

1. As a new article of manufacture, a spool holder comprising a detached body and a series of fingers each rigidly secured thereto at one end and free at the other and increasing in width and elasticity from the body outwardly toward its free end, said free end containing two spring loops formed by bending the wire of which the finger is composed, the said loops approximately parallel to each other but in different planes.

2. As a new article of manufacture, a spool holder comprising a detached body and a series of fingers each rigidly secured thereto at one end and free at the other and increasing in width and elasticity from the body outwardly toward its free end, said free end containing a plurality of spring loops formed by bending the wire of which the finger is composed.

3. A spool holder comprising a flat one-part body, a plurality of fingers rigidly supported therein and protruding therefrom, said fingers made of a plurality of wire loops and increasing in width and elasticity from the body outwardly toward its free end, said fingers located in pairs upon each side of said body.

VICTOR H. CANHAM.

Witnesses:
EDNA K. REYNOLDS,
LUCY A. FALKENBERG.